US010222902B2

(12) United States Patent
Chang et al.

(10) Patent No.: US 10,222,902 B2
(45) Date of Patent: Mar. 5, 2019

(54) TOUCH SENSING DEVICE AND TOUCH SENSING METHOD

(71) Applicant: CHUNGHWA PICTURE TUBES, LTD., Taoyuan (TW)

(72) Inventors: Wei-Fu Chang, Taoyuan (TW); Jhen-Shen Liao, Taoyuan (TW); Hung-Hsiang Chen, Taoyuan (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 0 days.

(21) Appl. No.: 15/387,674

(22) Filed: Dec. 22, 2016

(65) Prior Publication Data
US 2018/0143730 A1 May 24, 2018

(30) Foreign Application Priority Data
Nov. 24, 2016 (CN) ..................... 2016 2 1272817 U

(51) Int. Cl.
G06F 3/044 (2006.01)
G06F 3/041 (2006.01)

(52) U.S. Cl.
CPC ............ G06F 3/0416 (2013.01); G06F 3/044 (2013.01); G06F 2203/04108 (2013.01)

(58) Field of Classification Search
CPC ...... G06F 3/0416; G06F 3/044; G06F 3/0412; G09G 5/18; G02F 1/13338
USPC ....................................................... 345/173
See application file for complete search history.

(56) References Cited

U.S. PATENT DOCUMENTS

| 9,721,536 | B2* | 8/2017 | Kurasawa | ................ G09G 5/18 |
| 9,836,168 | B2* | 12/2017 | Fukushima | ............. G06F 3/044 |
| 2014/0139761 | A1* | 5/2014 | Yanagawa | ............... G06F 3/044 349/12 |
| 2014/0292709 | A1* | 10/2014 | Mizuhashi | ............ G06F 3/0416 345/174 |
| 2015/0075959 | A1* | 3/2015 | Lu | ......................... G06F 3/0416 200/5 R |
| 2015/0338963 | A1 | 11/2015 | Lee | |
| 2015/0370401 | A1* | 12/2015 | Mizuhashi | .......... G02F 1/13338 345/174 |

(Continued)

FOREIGN PATENT DOCUMENTS

TW 201001010 A 1/2010

Primary Examiner — Fred Tzeng
(74) Attorney, Agent, or Firm — CKC & Partners Co., LLC

(57) ABSTRACT

A touch sensing device includes a substrate, a first electrode, a second electrode, a third electrode, a fourth electrode. The first electrode receives a first triggering signal. The second electrode selectively receives the first triggering signal and a second triggering signal. The first electrode and the second electrode are parallelly disposed on the substrate. The third electrode senses contact touch event according to the first triggering signal to generate a first sensing signal. The fourth electrode selectively senses the contact touch event according to the first triggering signal to generate the first sensing signal and senses contactless touch event according to the second triggering signal to generate a second sensing signal. The third electrode and the fourth electrode are parallelly disposed on the substrate, and the third electrode and the fourth electrode are vertically disposed to the first electrode and the second electrode.

19 Claims, 10 Drawing Sheets

(56) References Cited

U.S. PATENT DOCUMENTS

2016/0357321 A1* 12/2016 Ito .................... G06F 3/0416
2017/0228081 A1*  8/2017 Jin .................... G06F 3/0412

* cited by examiner

TOUCH SENSING DEVICE AND TOUCH SENSING METHOD

RELATED APPLICATIONS

This application claims priority to Chinese Application Serial Number 201621272817.5, filed Nov. 24, 2016, which is herein incorporated by reference.

BACKGROUND

Field of Invention

The present disclosure relates to a sensing device and a sensing method. More particularly, the present disclosure relates to a touch sensing device and a touch sensing method.

Description of Related Art

With the rapid development of touch technology, a touch device is widely applied in human life and playing an increasingly important role. Currently, a common touch device is used as an input interface by manners of supporting contact touch event and contactless touch event to enhance convenience for a user to operate an electronic device. To make a touch device simultaneously support application of the contact touch event and the contactless touch event, a common manner is to dispose a contact touch event sensing module and a contactless touch event sensing module in the touch device at the same time. However, this manner may not only increase volume of a touch device, but also increase cost of manufacturing a touch device.

Accordingly, a significant challenge is related to ways in which to remain support application of a touch device while at the same time decreasing cost of manufacturing a touch device associated with designing touch sensing devices and touch sensing methods.

SUMMARY

An aspect of the present disclosure is directed to a touch sensing device. The touch sensing device includes substrate, a first electrode, a second electrode, a third electrode and a fourth electrode. The first electrode is configured to receive a first triggering signal. The second electrode is configured to selectively receive the first triggering signal and a second triggering signal. The first electrode and the second electrode are parallelly disposed on the substrate. The third electrode is configured to sense contact touch event according to the first triggering signal to generate a first sensing signal. The fourth electrode is configured to selectively sense the contact touch event according to the first triggering signal to generate the first sensing signal and to sense contactless touch event according to the second triggering signal to generate a second sensing signal. The third electrode and the fourth electrode are parallelly disposed on the substrate, and the third electrode and the fourth electrode are vertically disposed to the first electrode and the second electrode.

Another aspect of the present disclosure is directed to a touch sensing device. The touch sensing device includes a substrate, a first electrode, a second electrode, a third electrode, a fourth electrode and a sensing electrode. The first electrode is configured to receive a first triggering signal. The second electrode is configured to selectively receive the first triggering signal and a second triggering signal. The first electrode and the second electrode are parallelly disposed on the substrate. The third electrode is configured to sense contact touch event according to the first triggering signal to generate a first sensing signal. The fourth electrode is configured to sense the contact touch event according to the first triggering signal to generate the first sensing signal. The third electrode and the fourth electrode are parallelly disposed on the substrate, and the third electrode and the fourth electrode are vertically disposed to the first electrode and the second electrode to form a vacant area. The sensing electrode is disposed in the vacant area, and configured to sense contactless touch event according to the second triggering signal to generate a second sensing signal.

Again another aspect of the present disclosure is directed to a touch sensing method applied to a touch sensing device. The touch sensing device includes a substrate, a first electrode, a second electrode, a third electrode and a fourth electrode. The first electrode and the second electrode are parallelly disposed on the substrate. The third electrode and the fourth electrode are parallelly disposed on the substrate. The third electrode and the fourth electrode are vertically disposed to the first electrode and the second electrode. The touch sensing method includes steps as follows: receiving a first triggering signal during a first sequence via the first electrode and the second electrode; sensing contact touch event according to the first triggering signal during the first sequence to generate a first sensing signal via the third electrode and the fourth electrode; receiving a second triggering during a second sequence via the second electrode; and sensing contactless touch event according to the second triggering signal during the second sequence to generate a second sensing signal via the first electrode.

Again another aspect of the present disclosure is directed to a touch sensing method applied to a touch sensing device. The touch sensing device includes a substrate, a first electrode, a second electrode, a third electrode, a fourth electrode and a sensing electrode. The first electrode and the second electrode are parallelly disposed on the substrate. The third electrode and the fourth electrode are parallelly disposed on the substrate. The third electrode and the fourth electrode are vertically disposed to the first electrode and the second electrode to form a vacant are. The sensing electrode is disposed in the vacant area. The touch sensing method includes steps as follows: receiving a first triggering signal during a first sequence via the first electrode and the second electrode; sensing contact touch event according to the first triggering signal during the first sequence to generate a first sensing signal via the third electrode and the fourth electrode; receiving a second triggering during a second sequence via the second electrode; and sensing contactless touch event according to the second triggering signal during the second sequence to generate a second sensing signal via the sensing electrode.

It is to be understood that the foregoing general description and the following detailed description are by examples, and are intended to provide further explanation of the invention as claimed.

DETAILED DESCRIPTION

Figure 1A:
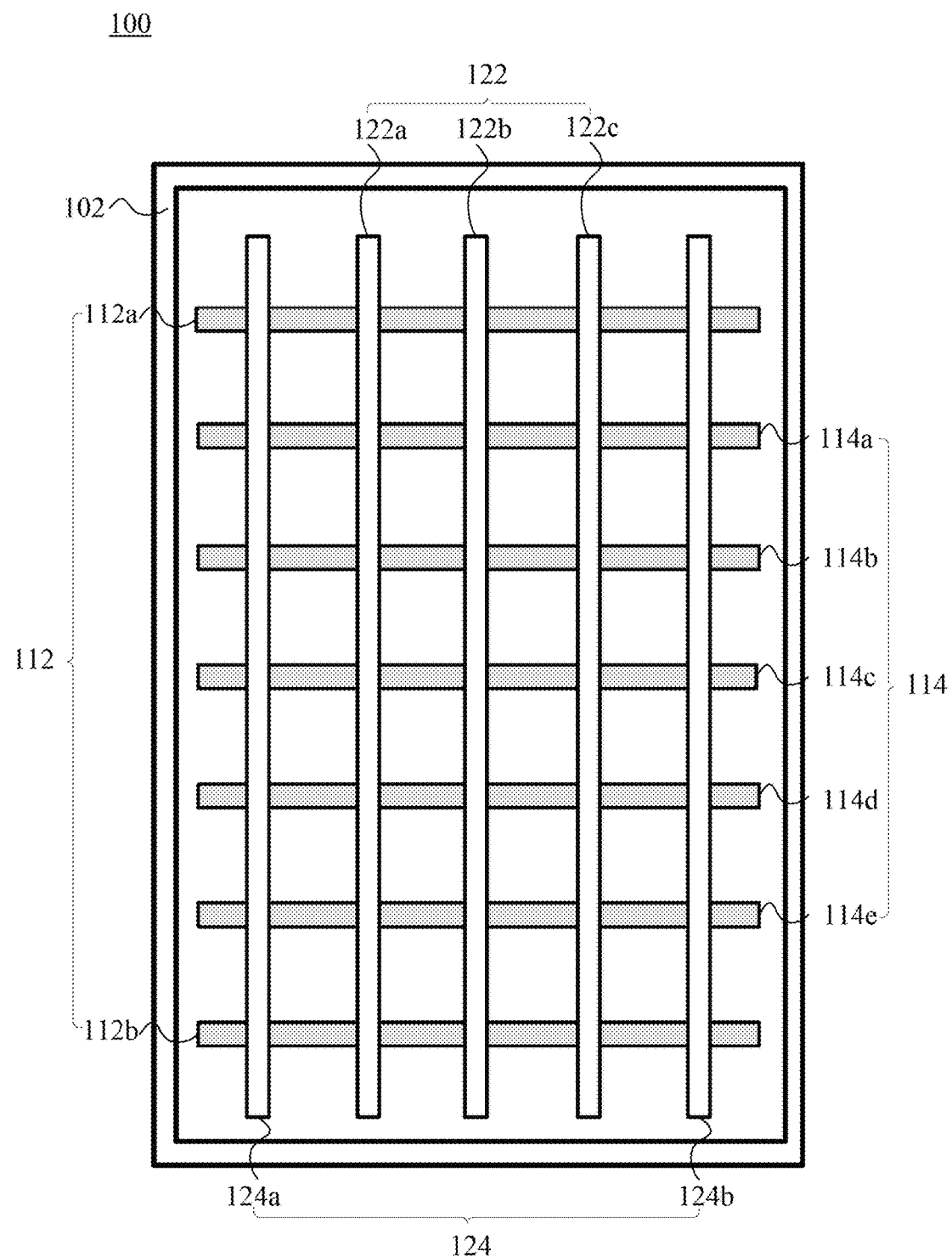
FIG. 1A is a schematic diagram of a structure of a touch sensing device according to embodiments of the present disclosure.
Figure 1B:
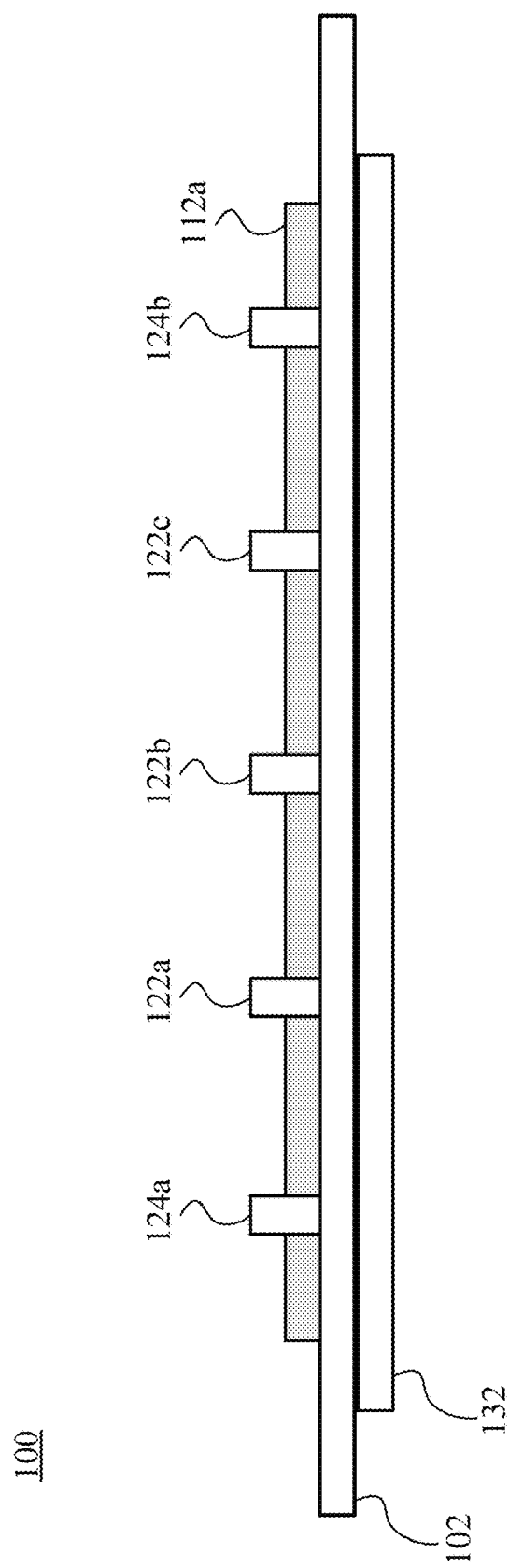
FIG. 1B is a schematic diagram of a side structure of the touch sensing device according to embodiments of the present disclosure.
Figure 1C:
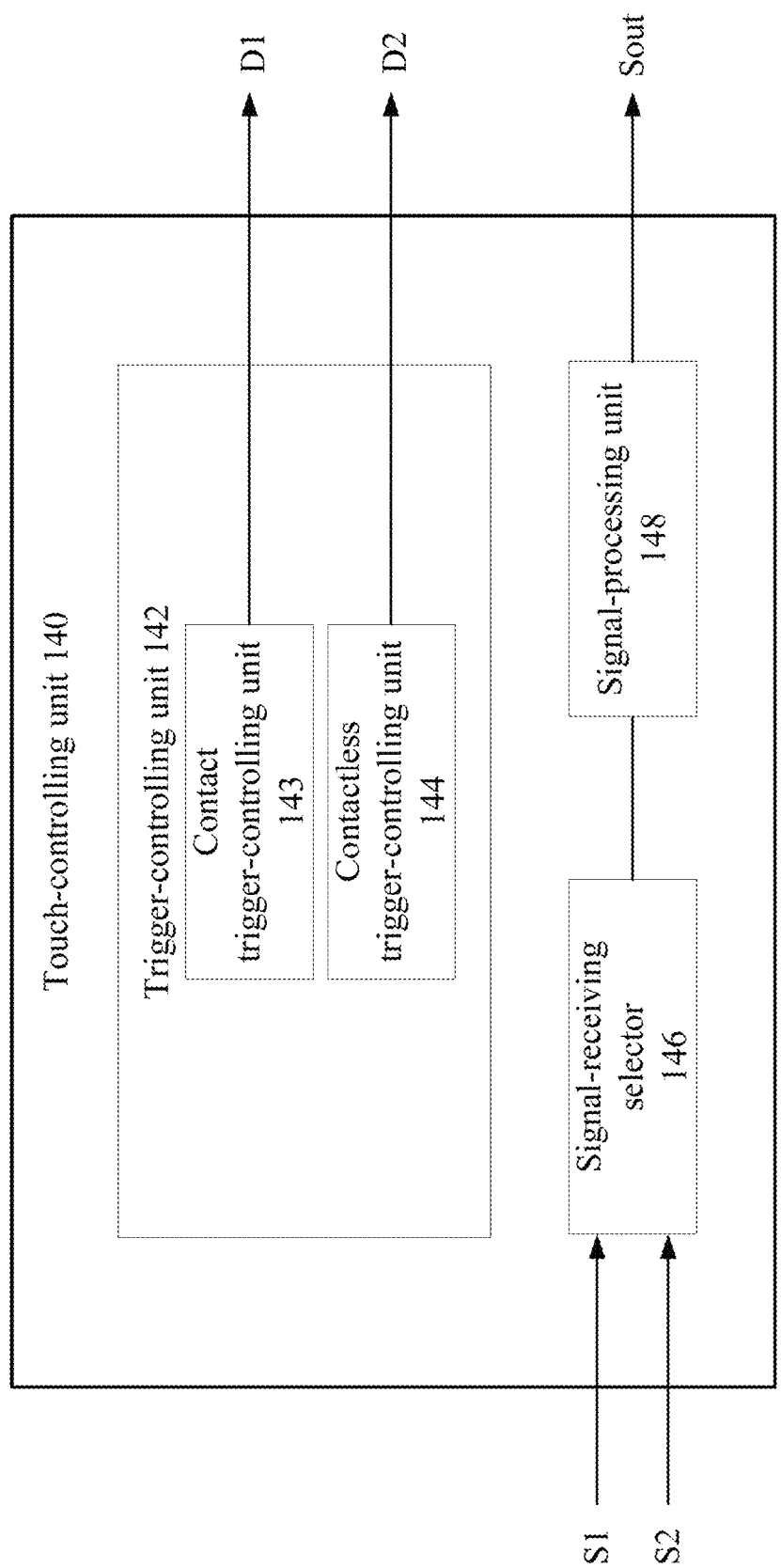
FIG. 1C is a block schematic diagram of a touch-controlling unit of the touch sensing device according to embodiments of the present disclosure.

FIG. 1A is a schematic diagram of a structure of a touch sensing device 100 according to embodiments of the present disclosure, and FIG. 1C is a block schematic diagram of a touch-controlling unit 140 of the touch sensing device 100 according to embodiments of the present disclosure. As shown in FIG. 1A and FIG. 1C, the touch sensing device 100 includes a substrate 102, a first electrode 112, a second electrode 114, a third electrode 122 and a fourth electrode 124. The first electrode 112 and the second electrode 114 are parallelly disposed on the substrate 102. The third electrode 122 and the fourth electrode 124 are parallelly disposed on the substrate 102. The third electrode 122 and the fourth electrode 124 are vertically disposed to the first electrode 112 and the second electrode 114.

The first electrode 112 (such as, the first electrodes 112a-112b) and the second electrode 114 (such as, the second electrodes 114a-114e) are configured to receive a first triggering signal D1. The third electrode 122 (such as, the third electrodes 122a-122c) is configured to sense contact touch event according to the first triggering signal D1 to generate a first sensing signal S1. The fourth electrode 124 (such as, the fourth electrodes 124a-124b) is configured to selectively sense the contact touch event according to the first triggering signal D1 to generate the first sensing signal S1 and to sense contactless touch event according to a second triggering signal D2 to generate a second sensing signal S2.

In one embodiment, reference is now made to FIG. 1B, and FIG. 1B is a schematic diagram of a side structure of the touch sensing device 100 according to embodiments of the present disclosure. As shown in FIG. 1B, the touch sensing device 100 further includes a triggering electrode 132. The first electrodes 112a-112b (the first electrode 112a is depicted), the second electrodes 114a-114e (not depicted), the third electrodes 122a-122c and the fourth electrodes 124a-124b are disposed on a first side of the substrate 102, and the triggering electrode 132 is disposed on a second side of the substrate 102. The triggering electrode 132 is configured to receive the second triggering signal D2.

In one embodiment, when the first electrode 112 and the second electrode 114 receive the first triggering signal D1 during a first sequence, the third electrode 122 and the fourth electrode 124 sense the contact touch event according to the first triggering signal D1 during the first sequence to generate the first sensing signal S1; when the triggering electrode 132 receives the second triggering signal D2 during a second sequence, the fourth electrode 124 senses the contactless touch event according to the second triggering signal D2 during the second sequence to generate the second sensing signal S2. For example, the touch sensing device 100 can trigger the third electrodes 122a-122c and the fourth electrodes 124a-124b to sense the contact touch event by the first triggering signal D1 (received by the first electrodes 112a-112b and the second electrodes 114a-114e), then trigger the fourth electrodes 124a-124b to sense the contactless touch event by the second triggering signal D2 (received by the triggering electrode 132). In other words, in this embodiment, by integrating sensing functions of the contact touch event and the contactless function into the fourth electrodes 124a-124b of the touch sensing device 100, thus the touch sensing device 100 can simultaneously support application of the contact touch event and the contactless touch event, and volume of the touch sensing device 100 and cost of manufacturing the touch sensing device 100 can be decreased.

In another embodiment, when the triggering electrode 132 receives the second triggering signal D2 during the second sequence, the first electrode 112 is configured to sense the contactless touch event according to the second triggering signal D2 during the second sequence to generate the second sensing signal S2. For example, the first electrodes 112a-112b can be configured to support a sensing function of the contactless touch event. In other words, in this embodiment, by integrating a triggering function of the contact touch event and a sensing function of the contactless touch event into the first electrodes 112a-112b of the touch sensing device 100, thus the touch sensing device 100 can simultaneously support application of the contact touch event and the contactless touch event, and volume of the touch sensing device 100 and cost of manufacturing the touch sensing device 100 can be decreased.

In further embodiment, when the triggering electrode 132 receives the second triggering signal D2 during the second sequence, one part of the second electrodes 114 (such as, the second electrode 114c) and one part of the third electrodes 122 (such as the third electrode 122b) are configured to sense the contactless touch event according to the second triggering signal D2 during the second sequence to generate the second sensing signal S2. For example, the second electrode 114c and the third electrode 122b can be configured to support a sensing function of the contactless touch event. In other words, in this embodiment, by integrating a triggering function of the contact touch event and a sensing function of the contactless touch event into the second electrode 114c of the touch sensing device 100 and by integrating sensing functions of the contact touch event and the contactless touch event into the third electrode 122b of the touch sensing device 100, thus the touch sensing device 100 can simultaneously support application of the contact touch event and the contactless touch event, and volume of the touch sensing device 100 and cost of manufacturing the touch sensing device 100 can be decreased. Additionally, in one embodiment, a sensing range of a three-dimensional electric field can be effective remained by setting protective distance among the first electrodes 112a-112b and the second electrode 114c. Similarly, the sensing range of the three-dimensional electric field can be effective remained by setting protective distance among the third electrode 122b and the fourth electrodes 124a-124b.

In one embodiment, reference is now made to FIG. 1C. As shown in FIG. 1C, the touch sensing device 100 further includes a touch-controlling unit 140, and the touch-controlling unit 140 includes a trigger-controlling unit 142. The trigger-controlling unit 142 is configured to generate the first triggering signal D1 and the second triggering signal D2, and to control generation order and duration of the first triggering signal D1 and the second triggering signal D2. For example, the trigger-controlling unit 142 can control the first electrode 112 and the second electrode 114 to receive the first triggering signal D1 during the first sequence, and control the triggering electrode 132 to receive the second triggering signal D2 during the second sequence. Additionally, the trigger-controlling unit 142 can control the duration of the first triggering signal D1 and the second triggering signal D2 to adjust a timing interval between the first sequence and the second sequence.

In another embodiment, the trigger-controlling unit 142 includes a contact trigger-controlling unit 143 and a contactless touch event trigger-controlling unit 144. The contact trigger-controlling unit 143 is configured to generate the first triggering signal D1, and to transmit the first triggering signal D1 to the first electrode 112 and the second electrode 114 to control generation timing and the duration of the first triggering signal D1. The contactless trigger-controlling unit 144 is configured to generate the second triggering signal D2, and to transmit the second triggering signal D2 to the triggering electrode 132 to control generation timing and the duration of the second triggering signal D2. It should be noted that, the generation order and the duration of the first triggering signal D1 and the second triggering signal D2 can be adjusted according to practical requirements correspondingly, thus the present disclosure is not limited to the embodiments mentioned above.

In further embodiment, the touch-controlling unit 140 includes a signal-receiving selector 146 and a signal-processing unit 148. The signal-receiving selector 146 is configured to selectively receive the first sensing signal S1 and the second sensing signal S2. The signal-processing unit 148 is electrically connected to the signal-receiving selector 146, and configured to generate a coordinate signal Sout according to the first sensing signal S1 or the second sensing signal S2. For example, the signal-receiving selector 146 can sequentially receive the first sensing signal S1 and the second sensing signal S2, and transmit the received first sensing signal S1 or the received second sensing signal S2 to the signal-processing unit 148 to generate the coordinate signal Sout. It should be noted that, reception order of the first sensing signal S1 and the second sensing signal S2 can be adjusted according to practical requirements correspondingly, thus the present disclosure is not limited to the embodiments mentioned above.

Figure 2A:
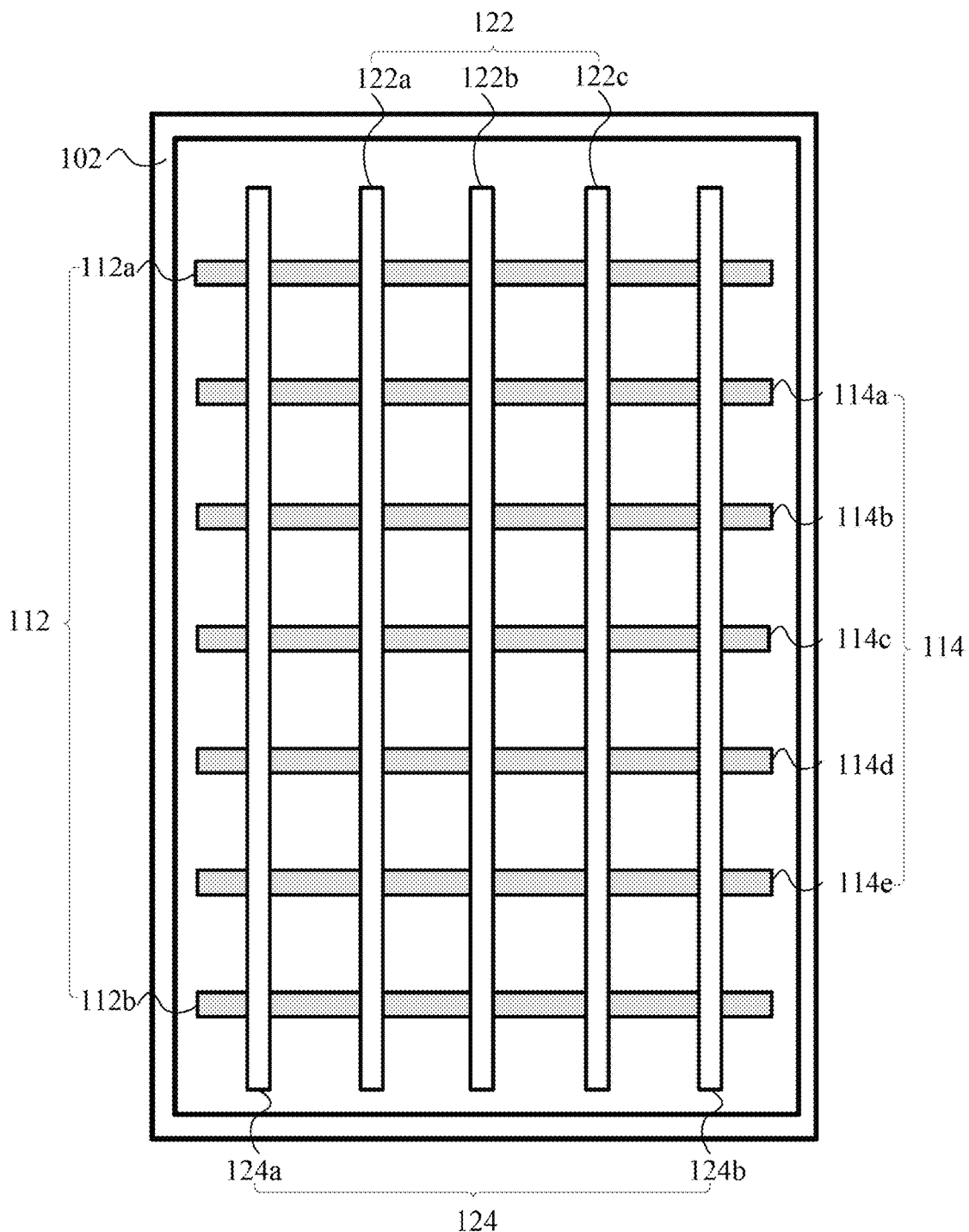
FIG. 2A is a schematic diagram of a structure of a touch sensing device according to embodiments of the present disclosure.
Figure 2B:
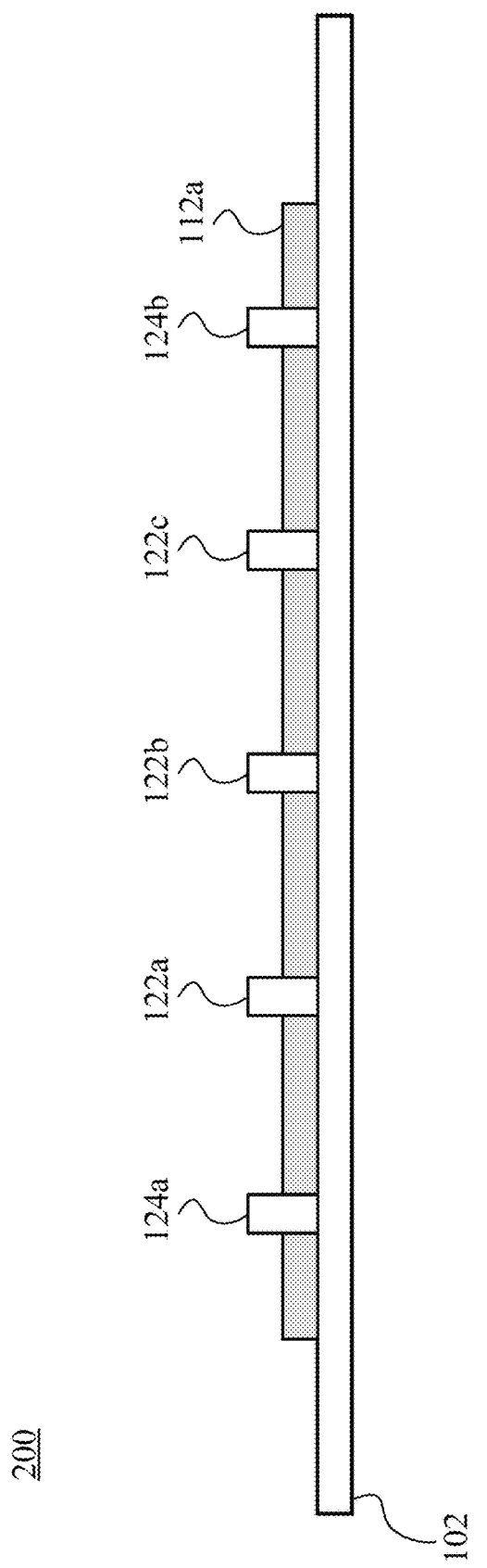
FIG. 2B is a schematic diagram of a side structure of the touch sensing device according to embodiments of the present disclosure.
Figure 2C:
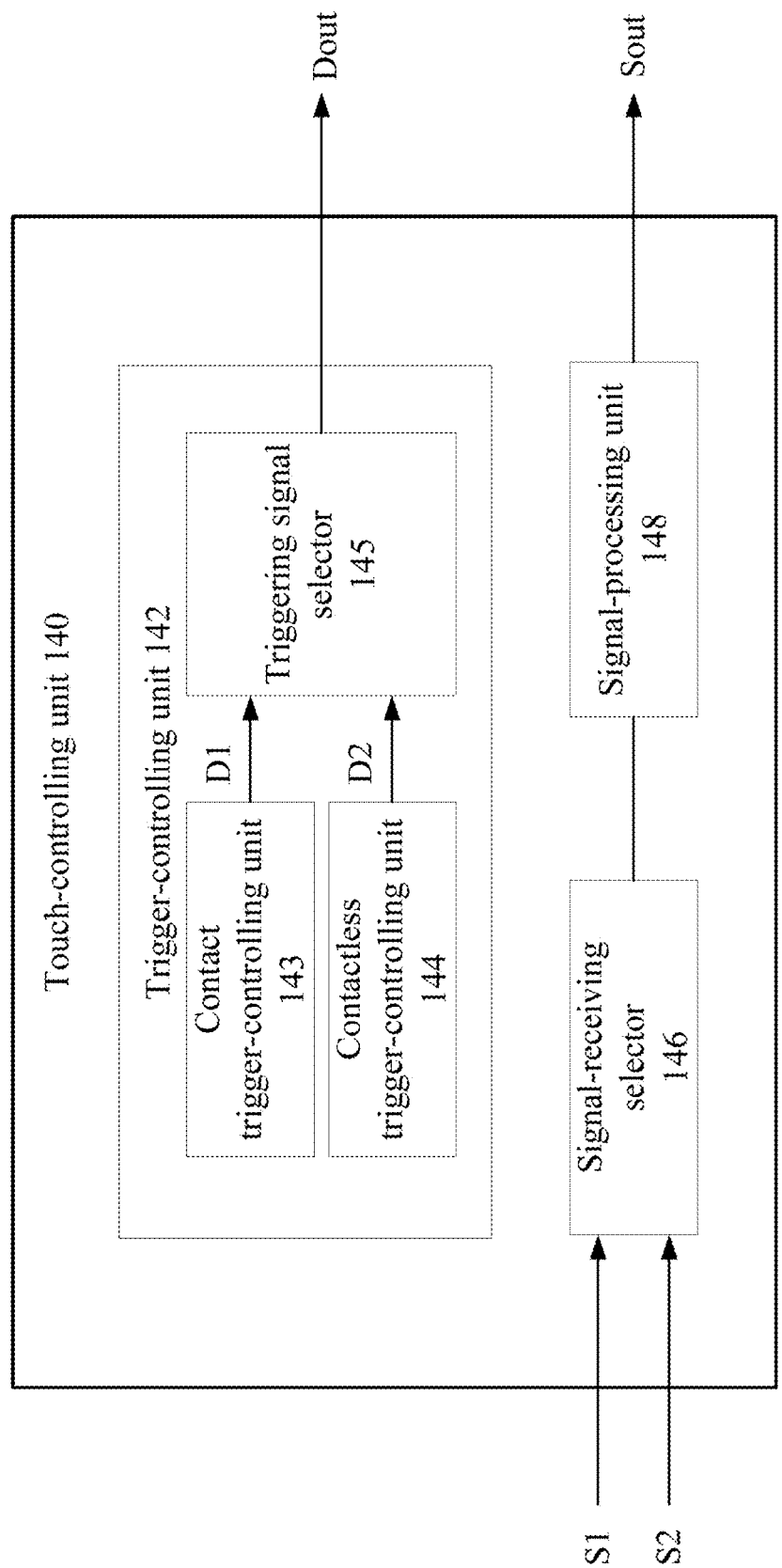
FIG. 2C is a block schematic diagram of a touch-controlling unit of the touch sensing device according to embodiments of the present disclosure.

FIG. 2A is a schematic diagram of a structure of a touch sensing device 200 according to embodiments of the present disclosure, and FIG. 2C is a block schematic diagram of a touch-controlling unit 140 of the touch sensing device 200 according to embodiments of the present disclosure. As shown in FIG. 2A and FIG. 2C, the touch sensing device 200 includes the substrate 102, the first electrode 112, the second electrode 114, the third electrode 122 and the fourth electrode 124, and configuration of the touch sensing device 200 is similar to that of the touch sensing device 100, so this will not be repeated. A main difference between the touch sensing device 200 and the touch sensing device 100 is that the second electrode 114 (such as, the second electrodes 114a-114e) of the touch sensing device 200 can be configured to selectively receive the first triggering signal D1 and the second triggering signal D2. In one embodiment, reference is now made to FIG. 2B, and FIG. 2B is a schematic diagram of a side structure of the touch sensing device 200 according to embodiments of the present disclosure. As shown in FIG. 2B, the first electrodes 112a-112b (the first electrode 112a is depicted), the second electrodes 114a-114e (not depicted), the third electrodes 122a-122c and the fourth electrodes 124a-124b are disposed on the same side of the substrate 102.

In one embodiment, when the first electrode 112 and the second electrode 114 receive the first triggering signal D1 during the first sequence, the third electrode 122 and the fourth electrode 124 sense the contact touch event according to the first triggering signal D1 during the first sequence to generate the first sensing signal S1; when the second electrode 114 receives the second triggering signal D2 during the second sequence, the first electrode 124 is configured to sense the contactless touch event according to the second triggering signal D2 during the second sequence to generate the second sensing signal S2. For example, the touch sensing device 200 can trigger the third electrodes 122a-122c and the fourth electrodes 124a-124b to sense the contact touch event by the first triggering signal D1 (received by the first electrodes 112a-112b and the second electrodes 114a-114e), then trigger the first electrodes 112a-112b to senses the contactless touch event by the second triggering signal D2 (received by one part of the second electrodes 114, such as the second electrodes 114b-114d). In other words in this embodiment, by integrating triggering functions of the contact touch event and the contactless touch event into the second electrodes 114b-114d of the touch sensing device 200 and by integrating sensing functions of the contact touch event and the contactless touch event into the first electrodes 112a-112b of the touch sensing device 200, thus the touch sensing device 200 can simultaneously support application of the contact touch event and the contactless touch event, and volume of the touch sensing device 200 and cost of manufacturing the touch sensing device 200 can be decreased. Additionally, in one embodiment, a sensing range of a three-dimensional electric field can be effective remained by setting protective distance among the first electrodes 112a-112b and the second electrodes 114b-114d.

In another embodiment, when the third electrode 122 is configured to receive the second triggering signal D2 during a third sequence, the fourth electrode 124 senses the contactless touch event according to the second triggering signal D2 during the third sequence to generate the second sensing signal S2. For example, the third electrode 122a-122c can be configured to support a triggering function of the contactless touch event. The touch sensing device 200 can adopt the second triggering signal D2 (received by the third electrodes 122a-122c) to trigger the fourth electrodes 124a-124b to sense the contactless touch event. In other words, in this embodiment, by integrating a triggering function and a sensing function of the contactless touch event into the third electrodes 122a-122c of the touch sensing device 200, thus the touch sensing device 200 can simultaneously support application of the contact touch event and the contactless touch event, and volume of the touch sensing device 200 and cost of manufacturing the touch sensing device 200 can be decreased. Additionally, in one embodiment, a sensing range of a three-dimensional electric field can be effective remained by setting protective distance among the third electrodes 122a-122c and the fourth electrodes 124a-124b.

In further embodiment, when one part of the second electrodes 114 (such as, the second electrodes 114a-114b and the second electrodes 114d-114e) are configured to receive the second triggering signal D2 during the second sequence, another part of the second electrodes 114 (such as, the second electrode 114c) can be configured to sense the contactless touch event according to the second triggering signal D2 during the second sequence to generate the second sensing signal S2. Similarly, when one part of the third electrodes 122 (such as, the third electrode 122a and the third electrode 122c) is configured to receive the second triggering signal D2 during the third sequence, another part of the third electrodes 122 (such as, the third electrode 122b) can be configured to sense the contactless touch event according to the second triggering signal D2 during the third sequence to generate the second sensing signal S2. For example, the second electrodes 114c and the third electrode 122b can be configured to support a sensing function of the contactless touch event. In others words, in this embodiment, by integrating a triggering function of the contact touch event and a sensing function of the contactless touch event into the second electrode 114c of the touch sensing device 200 and by integrating sensing functions of the contact touch event and the contactless touch event into the third electrode 122b of the touch sensing device 200, thus the touch sensing device 200 can simultaneously support application of the contact touch event and the contactless touch event, and volume of the touch sensing device 200 and cost of manufacturing the touch sensing device 200 can be decreased. Additionally, in one embodiment, a sensing range of a three-dimensional electric field can be effective remained by setting protective distance among the second electrodes 114a-114e. Similarly, the sensing range of the three-dimensional electric field can be effective remained by setting protective distance among the third electrodes 122a-122c.

In one embodiment, reference is now made to FIG. 2C. As shown in FIG. 2C, the touch sensing device 200 further includes the touch-controlling unit 140, and the touch-controlling unit 140 includes the trigger-controlling unit 142. The trigger-controlling unit 142 is configured to generate the first triggering signal D1 and the second triggering signal D2, and to control generation order and duration of the first triggering signal D1 and the second triggering signal D2 to generate the triggering signal Dout according to the first triggering signal D1 and the second triggering signal D2.

In another embodiment, the trigger-controlling unit 142 includes the contact trigger-controlling unit 143, the contactless trigger-controlling unit 144 and a triggering signal selector 145. The contact trigger-controlling unit 143 is configured to generate the first triggering signal D1, and to transmit the first triggering signal D1 to the triggering signal selector 145. The contactless trigger-controlling unit 144 is configured to generate the second triggering signal D2, and to transmit the second triggering signal D2 to the triggering signal selector 145. The triggering signal selector 145 is configured to generate the triggering signal Dout according to the first triggering signal D1 and the second triggering signal D2 to control generation order and duration of the first triggering signal D1 and the second triggering signal D2. For example, when the triggering signal selector 145 outputs the first triggering signal D1 as the triggering signal Dout, the triggering signal selector 145 can transmit the first triggering signal D1 to the first electrode 112 and the second electrode 114 during the first sequence; when the triggering signal selector 145 outputs the second triggering signal D2 as the triggering signal Dout, the triggering signal selector 145 can transmit the second triggering signal D2 to the second electrode 114 during the second sequence, and transmit the second triggering signal D2 to the third electrode 122 during the third sequence. It should be noted that, the generation order and the duration of the first triggering signal D1 and the second triggering signal D2 can be adjusted according to practical requirements correspondingly, thus the present disclosure is not limited to the embodiments mentioned above.

In further embodiment, the touch-controlling unit 140 includes the signal-receiving selector 146 and the signal-processing unit 148. The signal-receiving selector 146 is configured to selectively receive the first sensing signal S1 and the second sensing signal S2. The signal-processing unit 148 is electrically connected to the signal-receiving selector 146, and configured to generate the coordinate signal Sout according to the first sensing signal S1 or the second sensing signal S2. Since possible manners of implementing the signal-receiving selector 146 and the signal-processing unit 148 are illustrated by the above-mentioned embodiments and FIG. 1C in detail, so this will not be repeated.

Figure 3A:
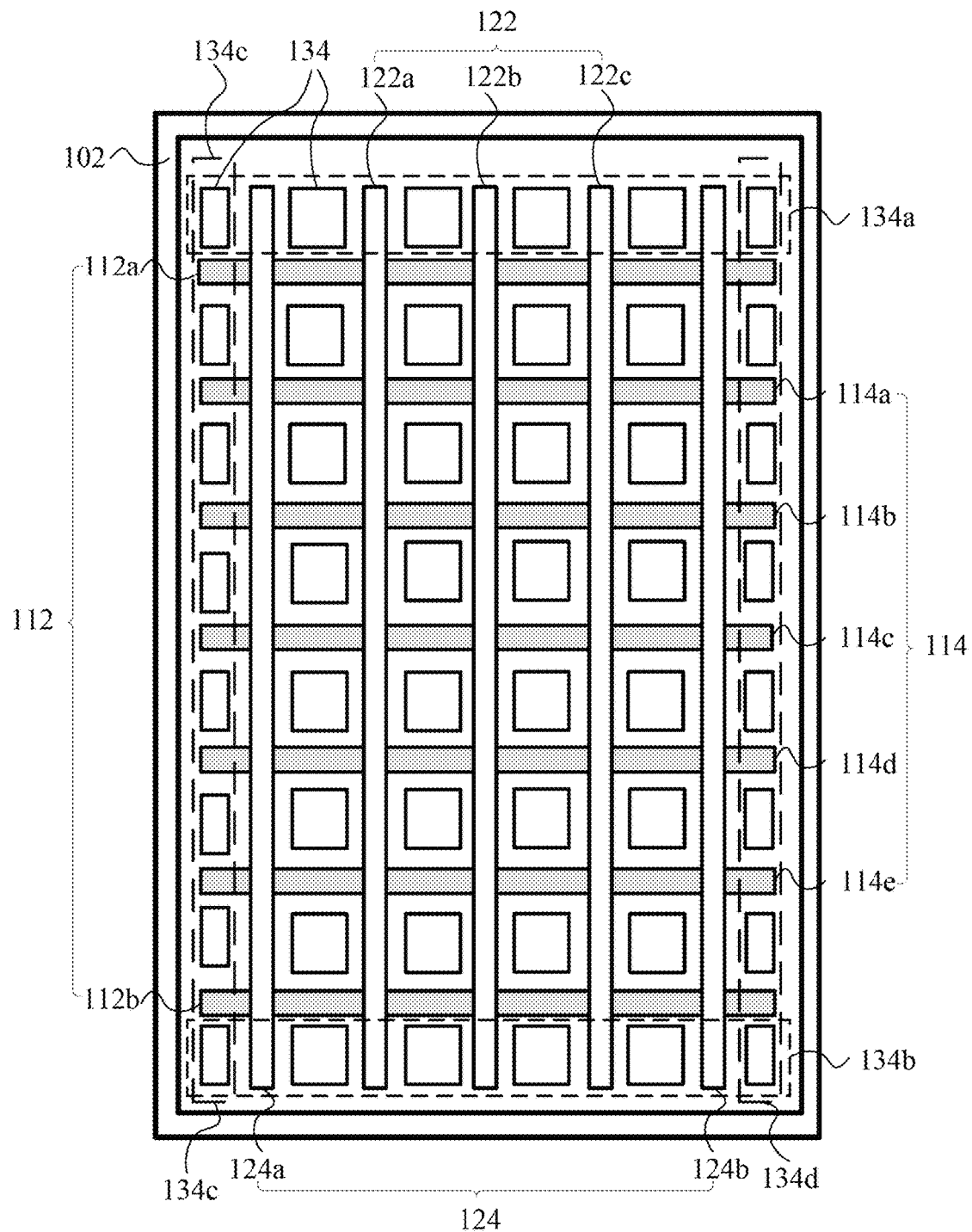
FIG. 3A is a schematic diagram of a structure of a touch sensing device according to embodiments of the present disclosure.

FIG. 3A is a schematic diagram of a structure of a touch sensing device 300 according to embodiments of the present disclosure. As shown in FIG. 3A and FIG. 2C, the touch sensing device 300 include the substrate 102, the first electrode 112, the second electrode 114, the third electrode 122, the fourth electrode 124 and a sensing electrode 134. The first electrode 112 and the second electrode 114 are parallelly disposed on the substrate 102. The third electrode 122 and the fourth electrode 124 are parallelly disposed on the substrate 102. The third electrode 122 and the fourth electrode 124 are vertically disposed to the first electrode 112 and the second electrode 114 to form a vacant area. The sensing electrode 134 is disposed in the vacant are.

The first electrode 112 (such as, the first electrodes 112a-112b) is configured to receive the first triggering signal D1. The second electrode 114 (such as, the second electrodes 114a-114e) is configured to selectively receive the first triggering signal D1 and the second triggering signal D2. The third electrode 122 (such as, the third electrodes 122a-122c) and the fourth electrode 124 (such as, the fourth electrodes 124a-124b) is configured to sense the contact touch event according to the first triggering signal D1 to generate the first sensing signal S1. The sensing electrode 134 is configured to sense the contactless touch event according to the second triggering signal D2 to generate the second sensing signal S2.

Figure 3B:
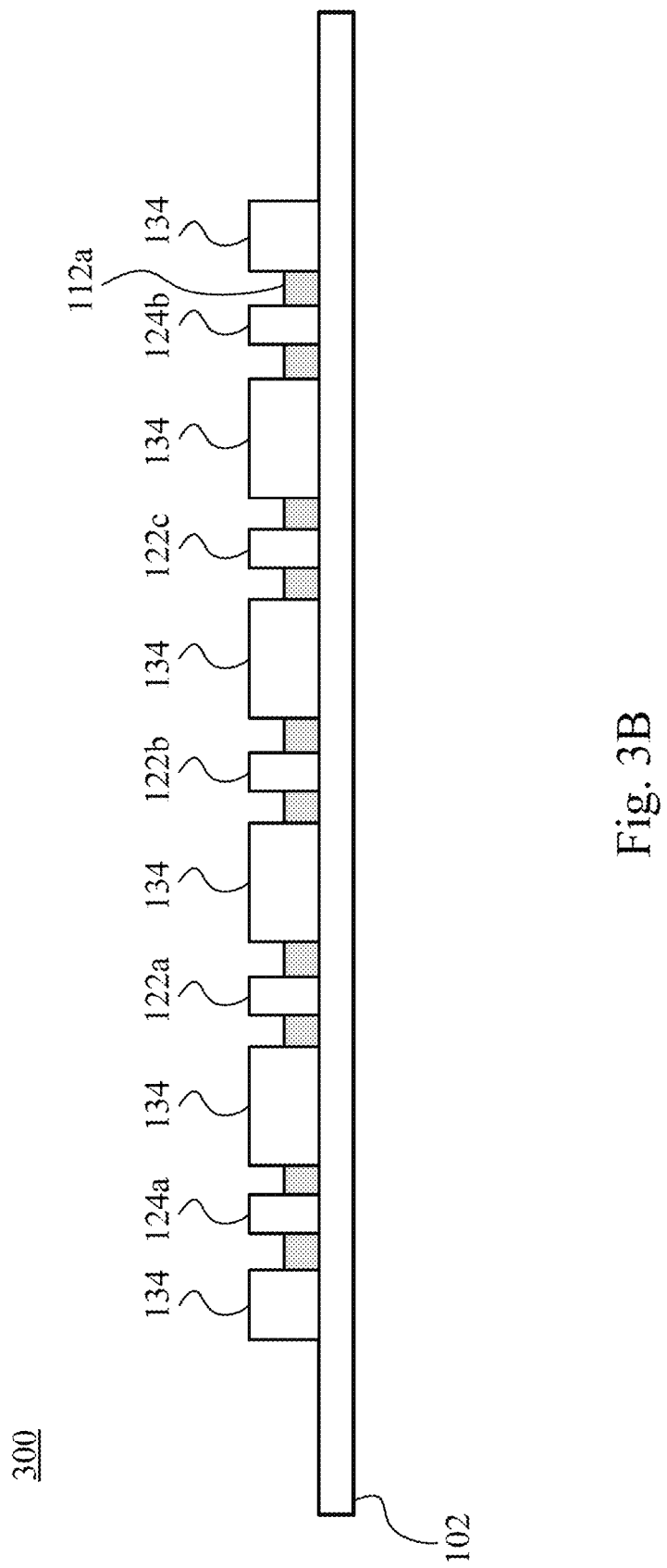
FIG. 3B is a schematic diagram of a side structure of the touch sensing device according to embodiments of the present disclosure.

In one embodiment, reference is now made to FIG. 3B, and FIG. 3B is a schematic diagram of a side structure of the touch sensing device 300 according to embodiments of the present disclosure. As shown in FIG. 3B, the first electrodes 112a-112b (the first electrode 112a is depicted), the second electrodes 114a-114e (not depicted), the third electrodes 122a-122c, the fourth electrodes 124a-124b and the sensing electrode 134 are disposed on the same side of the substrate 102.

In one embodiment, when the first electrode 112 and the second electrode 114 receive the first triggering signal D1 during the first sequence, the third electrode 122 and the fourth electrode 124 sense the contact touch event according to the first triggering signal D1 during the first sequence to generate the first sensing signal S1; when the second electrode 114 receives the second triggering signal D2 during the second sequence, the sensing electrode 134 senses the contactless touch event according to the second triggering signal D2 during the second sequence to generate the second sensing signal S2. For example, the touch sensing device 300 can trigger the third electrodes 122a-122c and the fourth electrodes 124a-124b to sense the contact touch event by the first triggering signal D1 (received by the first electrodes 112a-112b and the second electrodes 114a-114e), then trigger the sensing electrode 134 (such as, row sensing electrodes 134a-134b) to sense the contactless touch event by the second triggering signal D2 (received by the second electrodes 114a-114e). In other words, in this embodiment, by integrating triggering functions of the contact touch event and the contactless touch event into the second electrodes 114a-114e of the touch sensing device 300, thus the touch sensing device 300 can simultaneously support application of the contact touch event and the contactless touch event, and volume of the touch sensing device 300 and cost of manufacturing the touch sensing device 300 can be decreased. Additionally, in one embodiment, a sensing range of a three-dimensional electric field can be effective remained by setting protective distance among the second electrodes 114b-114d and the sensing electrode 134 (such as, the row sensing electrodes 134a-134b).

In another embodiment, when the third electrode 122 is configured to receive the second triggering signal D2 during the third sequence, the sensing electrode 134 senses the contactless touch event according to the second triggering signal D2 during the third sequence to generate the second sensing signal S2. For example, the touch sensing device 300 can adopt the second triggering signal D2 (received by the third electrodes 122a-122c) to trigger the sensing electrode 134 (such as, column sensing electrodes 134a-134b) to sense the contactless touch event. In other words, in this embodiment, by integrating a triggering function of the contact touch event and a sensing function of the contactless touch event into the third electrodes 122a-122c of the touch sensing device 300, thus the touch sensing device 300 can simultaneously support application of the contact touch event and the contactless touch event, and volume of the touch sensing device 300 and cost of manufacturing the touch sensing device 300 can be decreased. Additionally, in one embodiment, a sensing range of a three-dimensional electric field can be effective remained by setting protective distance among the third electrodes 122a-122c and the sensing electrode 134 (such as, the column sensing electrodes 134a-134b).

In one embodiment, the touch sensing device 300 further includes the touch-controlling unit 140 as shown in FIG. 2C, and the touch-controlling unit 140 includes the trigger-controlling unit 142. The trigger-controlling unit 142 is configured to generate the first triggering signal D1 and the second triggering signal D2, and to control generation order and duration of the first triggering signal D1 and the second triggering signal D2 to generate the triggering signal Dout according to the first triggering signal D1 and the second triggering signal D2. Since possible manners of implementing the touch-controlling unit 140 are illustrated by the above-mentioned embodiments and FIG. 2C in detail, so this will not repeated.

In another embodiment, the touch-controlling unit 140 includes the signal-receiving selector 146 and the signal-processing unit 148. The signal-receiving selector 146 is configured to selectively receive the first sensing signal S1 and the second sensing signal S2. The signal-processing unit 148 is electrically connected to the signal-receiving selector 146, and configured to generate the coordinate signal Sout according to the first sensing signal S1 or the second sensing signal S2. Since possible manners of implementing the signal-receiving selector 146 and the signal-processing unit 148 are illustrated by the above-mentioned embodiments and FIG. 2C in detail, so this will not be repeated.

Figure 4A:
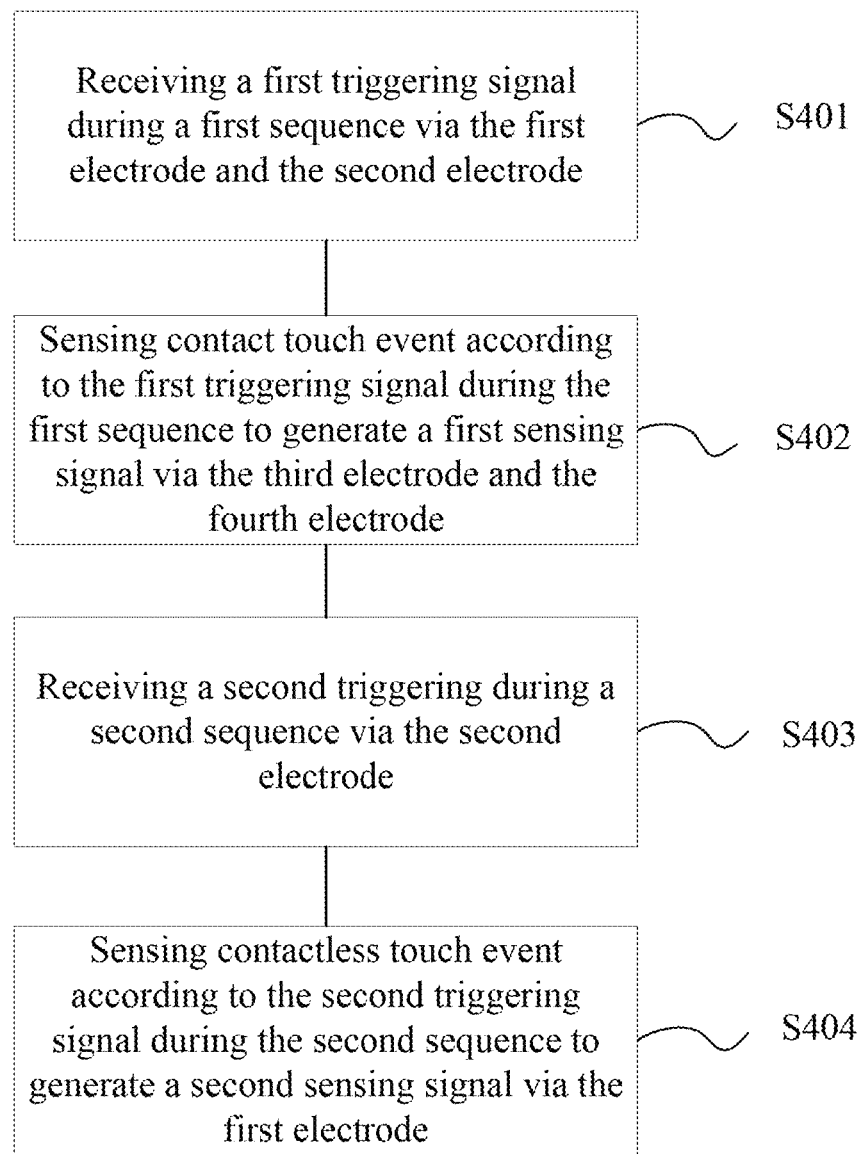
FIG. 4A and FIG. 4B are flow charts of touch sensing methods according to embodiments of the present disclosure.

FIG. 4A is a flow chart of a touch sensing method 400a according to embodiments of the present disclosure. In one embodiment, the touch sensing method 400a can be implemented by the touch sensing device 200 as shown in FIG. 2A, but the present disclosure is not limited thereto. For facilitating of understanding the touch sensing method 400a, the touch sensing device 200 is used as an example for illustrating the touch sensing method 400a as follows. As shown in FIG. 4A, the touch sensing method 400a includes steps as follows:

S401: receiving a first triggering signal D1 during a first sequence via the first electrode 112 and the second electrode 114;

S402: sensing contact touch event according to the first triggering signal D1 during the first sequence to generate a first sensing signal S1 via the third electrode 122 and the fourth electrode 124;

S403: receiving a second triggering signal D2 during a second sequence via the second electrode 114; and S404: sensing contactless touch event according to the second triggering signal D2 during the second sequence to generate a second sensing signal S2 via the first electrode 112.

For example, the touch sensing method 400a can be performed by the touch sensing device 200 to integrate sensing functions of the contact touch event and the contactless touch event into one part of the second electrodes 114 (such as, the second electrodes 114b-114d), and to integrate a triggering function of the contact touch event and a sensing function of the contactless touch event into the first electrodes 112a-112b, thus the touch sensing device 200 can simultaneously support application of the contact touch event and the contactless touch event, and volume of the touch sensing device 200 and cost of manufacturing the touch sensing device 200 can be decreased.

In one embodiment, the touch sensing method 400a can be performed by the third electrode 122 to receive the second triggering signal D2 during a third sequence, and be performed by the fourth electrode 124 to sense the contactless touch event according to the second triggering signal D2 during the third sequence to generate the second sensing signal S2. For example, in this embodiment, by integrating a triggering function and a sensing function of the contact touch event into the third electrodes 122a-122c, the touch sensing device 200 can simultaneously support application of the contact touch event and the contactless touch event, and volume of the touch sensing device 200 and cost of manufacturing the touch sensing device 200 can be decreased.

In another embodiment, the touch sensing method 400a can be performed by the trigger-controlling unit 142 as shown in FIG. 1C to generate the first triggering signal D1 and the second triggering signal D2, and to control generation order and duration of the first triggering signal D1 and the second triggering signal D2 to generate a triggering signal Dout according to the first triggering signal D1 and the second triggering signal D2. For example, the trigger-controlling unit 142 can control the first electrode 112 and the second electrode 114 to receive the first triggering signal D1 during the first sequence, and control the triggering electrode 132 to receive the second triggering signal D2 during the second sequence. Additionally, the trigger-controlling unit 142 can control the duration of the first triggering signal D1 and the second triggering signal D2 to adjust a timing interval between the first sequence and the second sequence. It should be noted that, the generation order and the duration of the first triggering signal D1 and the second triggering signal D2 can be adjusted according to practical requirements correspondingly, thus the present disclosure is not limited to the embodiments mentioned above.

In further embodiment, the touch sensing method 400a can be performed by the signal-receiving selector 146 as shown in FIG. 2C to selectively receive the first sensing signal S1 and the second sensing signal S2, and to generate a coordinate signal Sout according to the first sensing signal S1 or the second sensing signal S2 via the signal-processing unit 148. For example, the signal-receiving selector 146 can sequentially receive the first sensing signal S1 and the second sensing signal S2, and transmit the received first sensing signal S1 or the received second sensing signal S2 to the signal-processing unit 148 to generate the coordinate signal Sout. It should be noted that, reception order of the first sensing signal S1 and the second sensing signal S2 can be adjusted according to the practical requirements correspondingly, thus the present disclosure is not limited to the embodiments mentioned above.

Figure 4B:
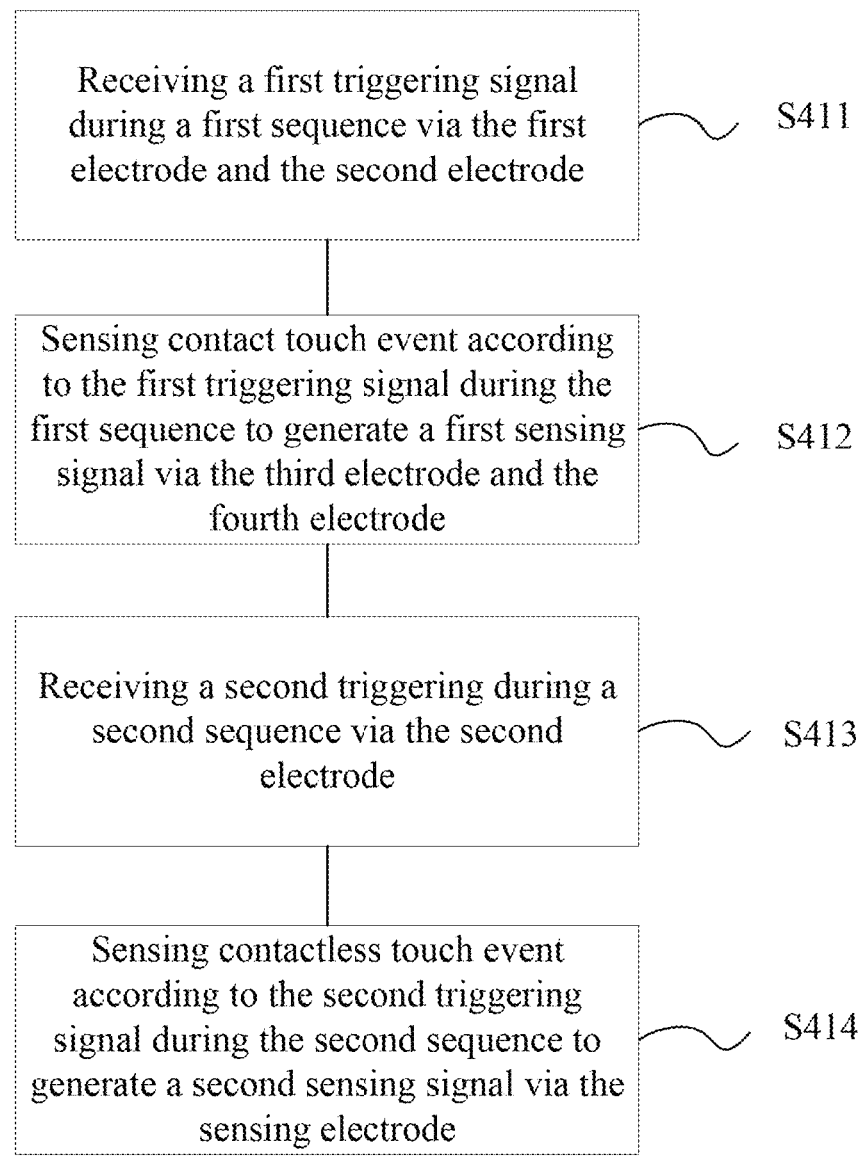

FIG. 4B is a flow chart of a touch sensing method 400b according to embodiments of the present disclosure. In one embodiment, the touch sensing method 400b can be implemented by the touch sensing device 300 as shown in FIG. 3A, but the present disclosure is not limited thereto. For facilitating of understanding the touch sensing method 400b, the touch sensing device 300 is used as an example for illustrating the touch sensing method 400b as follows. As shown in FIG. 4B, the touch sensing method 400b includes steps as follows:

S411: receiving a first triggering signal D1 during a first sequence via the first electrode 112 and the second electrode 114;

S412: sensing contact touch event according to the first triggering signal D1 during the first sequence to generate a first sensing signal S1 via the third electrode 122 and the fourth electrode 124;

S413: receiving a second triggering signal D2 during a second sequence via the second electrode 114; and S414: sensing contactless touch event according to the second triggering signal D2 during the second sequence to generate a second sensing signal S2 via the sensing electrode 134.

For example, the touch sensing method 400b can be performed by the touch sensing device 300 to integrate triggering function of the contact touch event and the contactless touch event into one part of the second electrodes 114 (such as, the second electrodes 114b-114d), thus the touch sensing device 300 can simultaneously support application of the contact touch event and the contactless touch event, and volume of the touch sensing device 300 and cost of manufacturing the touch sensing device 300.

The touch sensing method 400b can be performed by the third electrode 122 to receive the second triggering signal D2 during a third sequence, and be performed by the sensing electrode 134 to sense the contactless touch event according to the second triggering signal D2 during the third sequence to generate the second sensing signal S2. In other words, in this embodiment, by integrating a triggering function and a sensing function of the contactless touch event into the third electrodes 122a-122c, thus the touch sensing device 300 can simultaneously support application of the contact touch event and the contactless touch event, and volume of the touch sensing device 300 and cost of manufacturing the touch sensing device 300.

In another embodiment, the touch sensing method 400b can be performed by the trigger-controlling unit 142 as shown in FIG. 2C to generate the first triggering signal D1 and the second triggering signal D2, and to control generation order and duration of the first triggering signal D1 and the second triggering signal D2 to generate a triggering signal Dout according to the first triggering signal D1 and the second triggering signal D2. For example, the trigger-controlling unit 142 can control the first electrode 112 and the second electrode 114 to receive the first triggering signal D1 during the first sequence, and control the triggering electrode 132 to receive the second triggering signal D2 during the second sequence. Additionally, the trigger-controlling unit 142 can control the duration of the first triggering signal D1 and the second triggering signal D2 to adjust a timing interval between the first sequence and the second sequence. It should be noted that, the generation order and the duration of the first triggering signal D1 and the second triggering signal D2 can be adjusted according to practical requirements correspondingly, thus the present disclosure is not limited to the embodiments mentioned above.

In further embodiment, the touch sensing method 400b can be performed by the signal-receiving selector 146 as shown in FIG. 2C to selectively receive the first sensing signal S1 and the second sensing signal S2, and to generate a coordinate signal Sout according to the first sensing signal S1 or the second sensing signal S2 via the signal-processing unit 148. For example, the signal-receiving selector 146 can sequentially receive the first sensing signal S1 and the second sensing signal S2, and transmit the received first sensing signal S1 or the received second sensing signal S2 to the signal-processing unit 148 to generate the coordinate signal Sout. It should be noted that, reception order of the first sensing signal S1 and the second sensing signal S2 can be adjusted according to practical requirements correspondingly, thus the present disclosure is not limited to the embodiments mentioned above.

In the embodiments mentioned above, the touch sensing device of the present disclosure integrates triggering functions and sensing functions of the contact touch event and the contactless touch event into the first electrode, the second electrode, the third electrode and the fourth electrode to simultaneously support application of the contact touch event and the contactless touch event. For example, the first electrode and the second electrode can be configured to sequentially receive the first triggering signal and the second triggering signal, and the first triggering signal and the second triggering signal are configured to respectively trigger the contact touch event and the contactless touch event. The third electrode and the fourth electrode can be configured to sequentially sense the contact touch event according to the first triggering signal and sense the contactless touch event according to the second triggering signal. Accordingly, the touch sensing device of the present disclosure not only remains support application of the touch sensing device, but significantly decreases cost of manufacturing the touch sensing device.

What is claimed is:
1. A touch sensing device, comprising:
a substrate;
a first electrode, configured to receive a first triggering signal;
a second electrode, configured to selectively receive the first triggering signal and a second triggering signal, wherein the first electrode and the second electrode are parallelly disposed on the substrate;

a third electrode, configured to sense contact touch event according to the first triggering signal to generate a first sensing signal; and a fourth electrode, configured to selectively sense the contact touch event according to the first triggering signal to generate the first sensing signal and to sense contactless touch event according to the second triggering signal to generate a second sensing signal, wherein the third electrode and the fourth electrode are parallelly disposed on the substrate, and the third electrode and the fourth electrode are vertically disposed to the first electrode and the second electrode, wherein the substrate has an upper surface;

wherein the first electrode comprises at least one first sub-electrode, and the first sub-electrode has a length and a width, and a longitudinal axis extending along a lengthwise direction of the first sub-electrode;

wherein the second electrode comprises at least one second sub-electrode, and the second sub-electrode has a length and a width, and a longitudinal axis extending along a lengthwise direction of the second sub-electrode;

wherein when viewed from a direction normal to the upper surface of the substrate, the longitudinal axis of the first sub-electrode is parallel to the longitudinal axis of the second sub-electrode.

2. The touch sensing device of claim 1, wherein the first electrode, the second electrode, the third electrode and the fourth electrode are disposed on a first side of the substrate, and the touch sensing device further comprises:

a triggering electrode, disposed on a second side of the substrate, wherein when the first electrode and the second electrode are configured to receive the first triggering signal, the triggering electrode is configured to receive the second triggering signal.

3. The touch sensing device of claim 2, wherein when the first electrode and the second electrode receive the first triggering signal during a first sequence, the third electrode and the fourth electrode sense the contact touch event according to the first triggering signal during the first sequence to generate the first sensing signal; when the triggering electrode receives the second triggering signal during a second sequence, the fourth electrode senses the contactless touch event according to the second triggering signal during the second sequence to generate the second sensing signal.

4. The touch sensing device of claim 3, wherein when the triggering electrode receives the second triggering signal during the second sequence, the first electrode is configured to sense the contactless touch event according to the second triggering signal during the second sequence to generate the second sensing signal.

5. The touch sensing device of claim 1, wherein when the first electrode and the second electrode receive the first triggering signal during a first sequence, the third electrode and the fourth electrode sense the contact touch event according to the first triggering signal during the first sequence to generate the first sensing signal; when the second electrode receives the second triggering signal during a second sequence, the first electrode senses the contactless touch event according to the second triggering signal during the second sequence to generate the second sensing signal.

6. The touch sensing device of claim 5, wherein when the third electrode receives the second triggering signal during a third sequence, the fourth electrode senses the contactless touch event according to the second triggering signal during the third sequence to generate the second sensing signal.

7. The touch sensing device of claim 1, further comprising:

a trigger-controlling unit, configured to generate the first triggering signal and the second triggering signal, and to control generation order and duration of the first triggering signal and the second triggering signal.

8. The touch sensing device of claim 7, further comprising:

a signal-receiving selector, configured to selectively receive the first sensing signal and the second sensing signal; and a signal-processing unit, electrically connected to the signal-receiving selector, and configured to generate a coordinate signal according to the first sensing signal or the second sensing signal.

9. The touch sensing device of claim 1, wherein each of the first sub-electrode and the second sub-electrode is linearly shaped.

10. The touch sensing device of claim 1, wherein:

the first electrode comprises a plurality of the first sub-electrodes, and the second electrode comprises a plurality of the second sub-electrodes;

each of the first sub-electrodes has a length and a width, and a longitudinal axis extending along a lengthwise direction of the first sub-electrode;

each of the second sub-electrodes has a length and a width, and a longitudinal axis extending along a lengthwise direction of the second sub-electrode; and when viewed from the direction normal to the upper surface of the substrate, the longitudinal axis of each of the first sub-electrodes is parallel to the longitudinal axis of each of the second sub-electrodes.

11. The touch sensing device of claim 10, wherein each of the first sub-electrodes and each of the second sub-electrodes is linearly shaped.

12. A touch sensing device, comprising:

a substrate;

a first electrode, configured to receive a first triggering signal;

a second electrode, configured to selectively receive the first triggering signal and a second triggering signal, wherein the first electrode and the second electrode are parallelly disposed on the substrate;

a third electrode, configured to sense contact touch event according to the first triggering signal to generate a first sensing signal;

a fourth electrode, configured to sense the contact touch event according to the first triggering signal to generate the first sensing signal, wherein the third electrode and the fourth electrode are parallelly disposed on the substrate, and the third electrode and the fourth electrode are vertically disposed to the first electrode and the second electrode to form a vacant area; and a sensing electrode, disposed in the vacant area, and configured to sense contactless touch event according to the second triggering signal to generate a second sensing signal;

wherein when the first electrode and the second electrode receive the first triggering signal during a first sequence, the third electrode and the fourth electrode sense the contact touch event according to the first triggering signal during the first sequence to generate the first sensing signal; when the second electrode receives the second triggering signal during a second sequence, the sensing electrode senses the contactless touch event according to the second triggering signal during the second sequence to generate the second sensing signal;

wherein when the third electrode is configured to receive the second triggering signal during a third sequence, the sensing electrode senses the contactless touch event according to the second triggering signal during the third sequence to generate the second sensing signal.

13. The touch sensing device of claim 12, further comprising:
a trigger-controlling unit, configured to generate the first triggering signal and the second triggering signal, and to control generation order and duration of the first triggering signal and the second triggering signal.

14. The touch sensing device of claim 13, further comprising:
a signal-receiving selector, configured to selectively receive the first sensing signal and the second sensing signal; and
a signal-processing unit, electrically connected to the signal-reception selector, and configured to generate a coordinate signal according to the first sensing signal or the second sensing signal.

15. A touch sensing method, applied to a touch sensing device, wherein the touch sensing device comprises a substrate, a first electrode, multiple second electrodes, multiple third electrodes and a fourth electrode, wherein the first electrode and the multiple second electrodes are parallelly disposed on the substrate, the multiple third electrodes and the fourth electrode are parallelly disposed on the substrate, and the multiple third electrodes and the fourth electrode are vertically disposed to the first electrode and the multiple second electrodes, wherein the touch sensing method comprises:
receiving a first triggering signal during a first sequence via the first electrode and the multiple second electrodes;
sensing contact touch event according to the first triggering signal during the first sequence to generate a first sensing signal via the multiple third electrodes and the fourth electrode;
when one part of the multiple second electrodes receive a second triggering signal during a second sequence, sensing a contactless touch event according to the second triggering signal to generate a second sensing signal via another part of the multiple second electrodes; and
when one part of the multiple third electrodes receive the second triggering signal during a third sequence, sensing the contactless touch event according to the second triggering signal to generate the second sensing signal via another part of the multiple third electrodes.

16. The method of claim 15, wherein the touch sensing device further comprises a trigger-controlling unit, and the touch sensing method further comprises:
generating the first triggering signal and the second triggering signal, and controlling generation order and duration of the first triggering signal and the second triggering signal via the trigger-controlling unit.

17. The method of claim 16, wherein the touch sensing device further comprises a signal-receiving selector and a signal-processing unit, and the touch sensing method further comprises:
selectively receiving the first sensing signal and the second sensing signal via the signal-receiving selector; and
generating a coordinate signal according to the first sensing signal or the second sensing signal via the signal-processing unit.

18. A touch sensing method, applied to a touch sensing device, wherein the touch sensing device comprises a substrate, a first electrode, a second electrode, a third electrode, a fourth electrode and a sensing electrode, wherein the first electrode and the second electrode are parallelly disposed on the substrate, the third electrode and the fourth electrode are parallelly disposed on the substrate, the third electrode and the fourth electrode are vertically disposed to the first electrode and the second electrode to form a vacant are, and the sensing electrode is disposed in the vacant area, wherein the touch sensing method comprises:
receiving a first triggering signal during a first sequence via the first electrode and the second electrode;
sensing contact touch event according to the first triggering signal during the first sequence to generate a first sensing signal via the third electrode and the fourth electrode;
receiving a second triggering during a second sequence via the second electrode;
sensing contactless touch event according to the second triggering signal during the second sequence to generate a second sensing signal via the sensing electrode;
receiving the second triggering signal during a third sequence via the third electrode; and
sensing the contactless touch event according to the second triggering signal during the third sequence to generate the second sensing signal via the sensing electrode.

19. The method of claim 18, wherein the touch sensing device further comprises a trigger-controlling unit, a signal-receiving selector and a signal-processing unit, and the touch sensing method further comprises:
generating the first triggering signal and the second triggering signal, and controlling generation order and duration of the first triggering signal and the second triggering signal via the trigger-controlling unit;
selectively receiving the first sensing signal and the second sensing signal via the signal-receiving selector; and
generating a coordinate signal according to the first sensing signal or the second sensing signal via the signal-processing unit.

\* \* \* \* \*